United States Patent
Kim et al.

(10) Patent No.: US 10,047,833 B2
(45) Date of Patent: Aug. 14, 2018

(54) PLANETARY GEAR TRAIN OF AN AUTOMATIC TRANSMISSION FOR VEHICLES

(71) Applicant: HYUNDAI MOTOR COMPANY, Seoul (KR)

(72) Inventors: Jin Ho Kim, Suwon-si (KR); Jinseok Kim, Seoul (KR); Jae Chang Kook, Hwaseong-si (KR); Dong Hwan Hwang, Seoul (KR); Seong Wook Hwang, Gunpo-si (KR); Woo Jin Chang, Suwon-si (KR); Tae Whan Kim, Yongin-si (KR); Seongwook Ji, Gunpo-si (KR); Chon Ok Kim, Yongin-si (KR); Wonmin Cho, Hwaseong-si (KR); Hyun Sik Kwon, Seoul (KR); Jong Sool Park, Hwaseong-si (KR); Kyeong Hun Lee, Seoul (KR); Jong Soo Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 100 days.

(21) Appl. No.: 15/375,965

(22) Filed: Dec. 12, 2016

(65) Prior Publication Data
US 2018/0087617 A1 Mar. 29, 2018

(30) Foreign Application Priority Data
Sep. 29, 2016 (KR) .......................... 10-2016-0125560

(51) Int. Cl.
F16H 3/66 (2006.01)

(52) U.S. Cl.
CPC ....... *F16H 3/66* (2013.01); *F16H 2200/0069* (2013.01); *F16H 2200/2012* (2013.01); *F16H 2200/2048* (2013.01)

(58) Field of Classification Search
None
See application file for complete search history.

(56) References Cited

U.S. PATENT DOCUMENTS 8,795,128 B2 8/2014 Mellet et al.

*Primary Examiner* — Jacob S Scott
(74) *Attorney, Agent, or Firm* — Lempia Summerfield Katz LLC

(57) ABSTRACT

A planetary gear train disclosed herein includes an input shaft for receiving engine torque; an output shaft for outputting shifted torque; a first planetary gear set having first, second, and third rotational elements; a second planetary gear set having fourth, fifth, and sixth rotational elements; a third planetary gear set having seventh, eighth, and ninth rotational elements; a fourth planetary gear set having tenth, eleventh, and twelfth rotational elements; a first shaft interconnecting the first, fifth, ninth, and tenth rotational elements; a second shaft connected with the second rotational element and the input shaft; a third shaft connected with the third rotational element; a fourth shaft interconnecting the sixth and eighth rotational elements, and selectively connected with the second shaft; a fifth shaft connected with the seventh rotational element and selectively connected with the second shaft; and a sixth shaft connected with the eleventh rotational element and the output shaft.

20 Claims, 2 Drawing Sheets

FIG. 2

| Shift-stage | Control element | | | | | | | Gear ratio | Step ratio | Note |
|---|---|---|---|---|---|---|---|---|---|---|
| | C1 | C2 | C3 | B1 | B2 | B3 | B4 | | | |
| D1 | | | ● | ● | | ● | | 6.035 | – | |
| D2 | | ● | | ● | | ● | | 3.721 | 1.622 | |
| D3 | | ● | ● | ● | | | | 2.63 | 1.415 | |
| D4 | | ● | ● | ● | | | ● | 1.787 | 1.472 | |
| D5 | ● | | | | | | ● | 1.29 | 1.385 | Gear ratio span : 10.26 |
| D6 | ● | ● | ● | | | | | 1 | 1.290 | |
| D7 | ● | ● | | | | ● | | 0.877 | 1.140 | Ratio of REV vs D1 : 0.92 |
| D8 | ● | | ● | | | ● | | 0.788 | 1.113 | |
| D9 | ● | | ● | | ● | ● | | 0.677 | 1.164 | |
| D10 | ● | | ● | | ● | | | 0.588 | 1.151 | |
| REV | | | ● | ● | ● | | | -5.576 | – | | ated through the achievement of the more shift-stages.
PLANETARY GEAR TRAIN OF AN AUTOMATIC TRANSMISSION FOR VEHICLES

CROSS-REFERENCE TO RELATED APPLICATION

This application claims priority to and the benefit of Korean Patent Application No. 10-2016-0125560 filed in the Korean Intellectual Property Office on Sep. 29, 2016, the entire contents of which are incorporated herein by reference.

BACKGROUND (a) Field

The present disclosure relates to a planetary gear train of an automatic transmission for a vehicle. More particularly, the present disclosure relates to a planetary gear train of an automatic transmission for a vehicle, which is capable of implementing at least ten forward speeds using a minimum number of configurations, improving power transmission performance and fuel efficiency by increasing a span of a gear shift ratio, and providing uniformity (e.g., linearity of graph) of ratios between gear shift stages.

(b) Description of the Related Art

In general, in an automatic transmission field, research for achieving more shift-stages has been made as a technology for maximizing enhancement of fuel consumption and drivability of a vehicle, and recently, increasing oil prices are triggering competition in enhancing fuel consumption of a vehicle.

In this sense, research for an engine has been made to achieve weight reduction and to enhance fuel consumption by so-called downsizing. Research for an automatic transmission has been made to simultaneously provide better drivability and fuel consumption by achieving more shift-stages.

However, in the case of the automatic transmission, as the number of shift stages is increased, the number of internal parts, particularly, the number of planetary gear sets is increased. Thus, the length of the transmission is increased, thereby causing mountability, production cost, weight, power transfer efficiency, etc., to be deteriorated.

Therefore, it may be important for the automatic transmission to develop a planetary gear train capable of generating maximum efficiency with a small number of parts in order to increase a fuel consumption improvement effect through the achievement of the more shift-stages.

In this respect, an eight-speed automatic transmission has been recently introduced, and a planetary gear train for an automatic transmission enabling more shift stages is under investigation.

An automatic transmission of eight or more shift-stages may include three to four planetary gear sets and five to seven control elements (frictional elements). The automatic transmission may thus become lengthy, thereby deteriorating mountability.

Therefore, in order to achieve more shift-stages of the automatic transmission, recently, a double row structure in which the planetary gear set is disposed on the planetary gear set is adopted, or a dog clutch is applied instead of a wet control element. However, this solution has a problem that an applicable structure is limited, and deterioration of shift sense is accompanied due to the application of the dog clutch.

In addition, considering that gear ratio spans of recently developed eight-speed automatic transmissions may be between 6.5 and 7.5, fuel consumption enhancement is not very large, and in the case of a gear ratio span of an eight-speed automatic transmission having a level above 9.0, it is difficult to maintain step ratios between adjacent shift stages to be linear, by which driving efficiency of an engine and drivability of a vehicle deteriorated.

Thus, research studies are under way for developing a high efficiency automatic transmission having nine or more speeds.

The above information disclosed in this Background section is only for enhancement of understanding of the background and therefore it may contain information that does not form the prior art that is already known in this country to a person of ordinary skill in the art.

BRIEF SUMMARY

The present disclosure has been made in an effort to provide a planetary gear train of an automatic transmission for a vehicle having advantages of, by minimal complexity, realizing at least ten forward speeds and one reverse speed, increasing a gear ratio span so as to improve power delivery performance and fuel consumption, and achieving uniformity (e.g., linearity of graph) of ratios between gear shift stages.

A planetary gear train of an automatic transmission for a vehicle according to an embodiment may include an input shaft for receiving an engine torque; an output shaft for outputting a shifted torque: a first planetary gear set having first, second, and, third rotational elements; a second planetary gear set having fourth, fifth, and sixth rotational elements; a third planetary gear set having seventh, eighth, and ninth rotational elements; a fourth planetary gear set having tenth, eleventh, and, twelfth rotational elements; a first shaft interconnecting the first rotational element, the fifth rotational element, the ninth rotational element, and the tenth rotational element; a second shaft connected with the second rotational element and connected with the input shaft; a third shaft connected with the third rotational element; a fourth shaft interconnecting the sixth rotational element and the eighth rotational element, and selectively connected with the second shaft; a fifth shaft connected with the seventh rotational element and selectively connected with the second shaft; and a sixth shaft connected with the eleventh rotational element and connected with the output shaft.

The planetary gear train may further include a seventh shaft connected with the fourth rotational element and selectively connected with a transmission housing and an eighth shaft connected with the twelfth rotational element and selectively connected with the transmission housing. The fourth shaft may be selectively connected with the transmission housing, and the fifth shaft may be selectively connected with the transmission housing, and the sixth shaft may be selectively connected with the third shaft.

The first, second, and third rotational element of the first planetary gear set may be respectively a first sun gear, a first planet carrier, and a first ring gear of the first planetary gear set. The fourth, fifth, and sixth rotational element of the second planetary gear set may be respectively a second sun gear, a second planet carrier, and a second ring gear of the second planetary gear set. The seventh, eighth, and ninth rotational elements of the third planetary gear set may be respectively a third sun gear, a third planet carrier, and a third ring gear of the third planetary gear set. The tenth, eleventh, and twelfth rotational elements of the fourth planetary gear set are respectively a fourth sun gear, a fourth planet carrier, and a fourth ring gear of the fourth planetary gear set.

The first, second, third, and fourth planetary gear set may be arranged in the order of first, third, second, and fourth planetary gear sets, from an engine side.

The planetary gear train may further include a first clutch selectively connecting the third shaft and the sixth shaft, a second clutch selectively connecting the second shaft and the fourth shaft, a third clutch selectively connecting the second shaft and the fifth shaft, a first brake selectively connecting the eighth shaft to the transmission housing, a second brake selectively connecting the fourth shaft to the transmission housing, a third brake selectively connecting the seventh shaft to the transmission housing, and a fourth brake selectively connecting the fifth shaft to the transmission housing.

A planetary gear train according to an embodiment may realize ten forward speeds and one reverse speed formed by operating the four planetary gear sets as simple planetary gear sets by controlling seven control elements.

In addition, according to a planetary gear train according to an exemplary embodiment, a gear ratio span of more than 10.0 may be provided, thereby maximizing an engine driving efficiency.

In addition, the linearity of step ratios of shift stages is secured while multi-staging the shift stage with high efficiency, thereby making it possible to improve drivability such as acceleration before and after a shift, an engine speed rhythmic sense, and the like.

Further, effects that can be obtained or expected from embodiments are directly or suggestively described in the following detailed description. That is, various effects expected from exemplary embodiments will be described in the following detailed description.

BRIEF DESCRIPTION OF THE DRAWINGS

FIG. 2 is an operational chart for respective control elements at respective shift-stages in a planetary gear train according to an embodiment.

DETAILED DESCRIPTION

Figure 1:
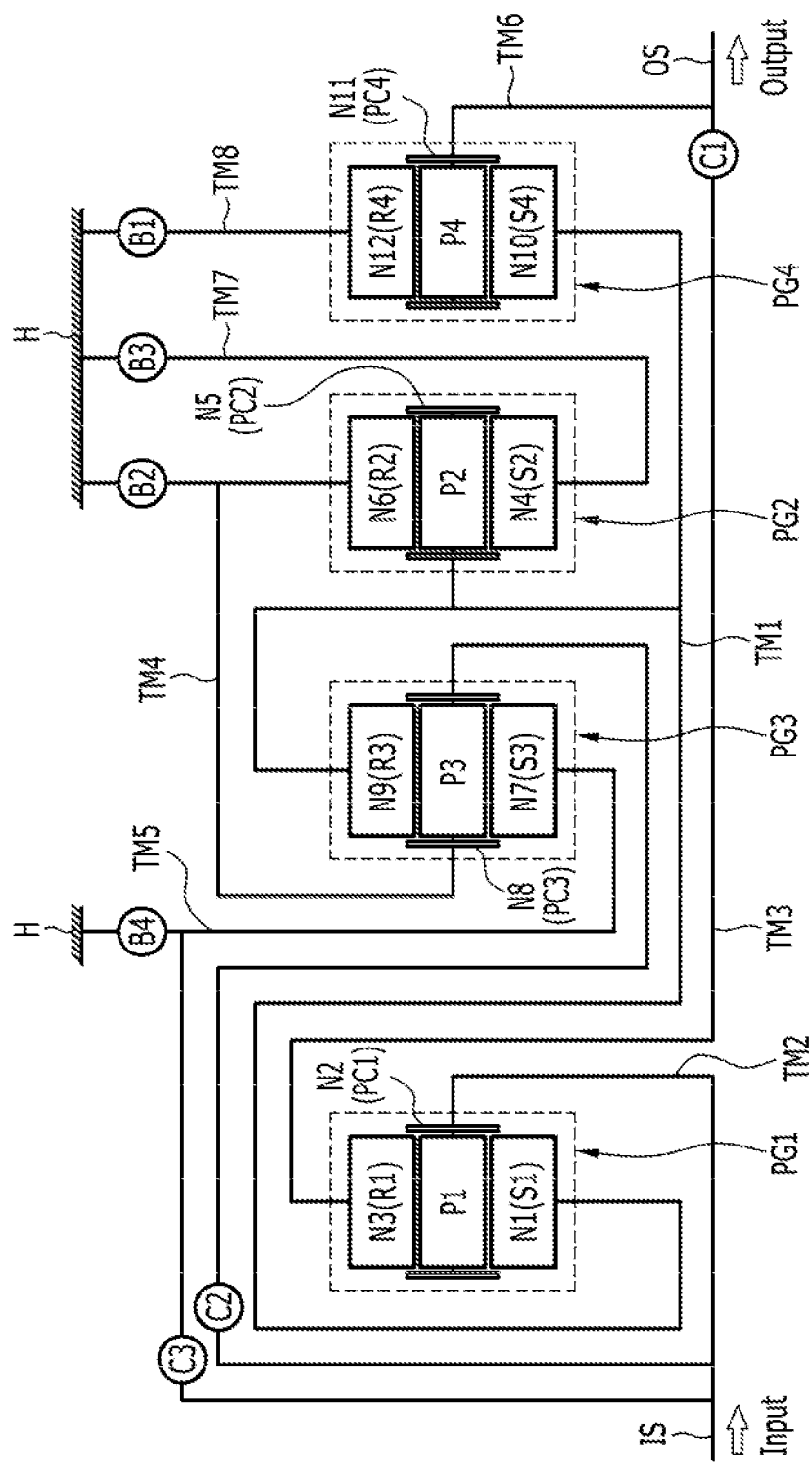
FIG. 1 is a schematic diagram of a planetary gear train according to an exemplary embodiment.

Hereinafter, embodiments of the present disclosure will be described in detail with reference to drawings.

The drawings and description are to be regarded as illustrative in nature and not restrictive, and like reference numerals designate like elements throughout the specification.

In the following description, dividing names of components into first, second, and the like is to divide the names because the names of the components are the same as each other and an order thereof is not particularly limited. In the drawings and throughout the description, the following component name are utilized:

B1, B2, B3, B4 are first, second, third, and fourth brakes;
C1, C2, C3 are first, second, and third clutches;
PG1, PG2, PG3, PG4 are first, second, third, and fourth planetary gear sets;
S1, S2, S3, S4 are first, second, third, and fourth sun gears;
PC1, PC2, PC3, PC4 are first, second, third, and fourth planet carriers;
R1, R2, R3, R4 are first, second, third, and fourth ring gears;
IS is an input shaft;
OS is an output shaft; and
TM1, TM2, TM3, TM4, TM5, TM6, TM7, TM8 are first, second, third, fourth, fifth, sixth, seventh, and eighth shafts.

FIG. 1 is a schematic diagram of a planetary gear train according to an embodiment of the present disclosure.

Referring to FIG. 1, a planetary gear train according to a first embodiment of the present disclosure includes first, second, third, and four planetary gear sets PG1, PG2, PG3, and PG4 arranged on a same axis, an input shaft IS, an output shaft OS, eight shafts TM1 to TM8 interconnecting rotational elements of the first, second, third, and four planetary gear sets PG1, PG2, PG3, and PG4, three clutches C1 to C3 and four brakes B1 to B4 as control elements, and a transmission housing H.

Torque input from the input shaft IS is shifted by cooperative operation of the first, second, third, and fourth planetary gear sets PG1, PG2, PG3, and PG4, and then output through the output shaft OS.

In one embodiment, the planetary gear sets are arranged in the order of first, third, second, and fourth planetary gear sets PG1, PG3, PG2, and PG4, from an engine side.

The input shaft IS is an input member and the torque from a crankshaft of an engine is input into the input shaft IS, after being torque-converted through a torque converter.

The output shaft OS is an output member, and being arranged on a same axis with the input shaft IS, delivers a shifted driving torque to a drive shaft through a differential apparatus (not shown).

The first planetary gear set PG1 is a single pinion planetary gear set, and includes a first sun gear S1, a first planet carrier PC1 that supports first pinion gear P1 externally engaged with the first sun gear S1, and a first ring gear R1 that is internally engaged with the first pinion gear P1. The first sun gear S1 acts as a first rotational element N1, the first planet carrier PC1 acts as a second rotational element N2, and the first ring gear R1 acts as a third rotational element N3.

The second planetary gear set PG2 is a single pinion planetary gear set, and includes a second sun gear S2, a second planet carrier PC2 that supports second pinion gear P2 externally engaged with the second sun gear S2, and a second ring gear R2 that is internally engaged with the second pinion gear P2. The second sun gear S2 acts as a fourth rotational element N4, the second planet carrier PC2 acts as a fifth rotational element N4, and the second ring gear R2 acts as a sixth rotational element N6.

The third planetary gear set PG3 is a single pinion planetary gear set, and includes a third sun gear S3, a third planet carrier PC3 that supports third pinion gear P3 externally engaged with the third sun gear S3, and a third ring gear R3 that is internally engaged with the third pinion gear P3. The third sun gear S3 acts as a seventh rotational element N7, the third planet carrier PC3 acts as an eighth rotational element N8, and the third ring gear R3 acts as a ninth rotational element N9.

The fourth planetary gear set PG4 is a single pinion planetary gear set, and includes a fourth sun gear S4, a fourth planet carrier PC4 that supports fourth pinion gear P4 externally engaged with the fourth sun gear S4, and a fourth ring gear R4 that is internally engaged with the fourth pinion gear P4. The fourth sun gear S4 acts as a tenth rotational element N10, the fourth planet carrier PC4 acts as an eleventh rotational element N11, and the fourth ring gear R4 acts as a twelfth rotational element N12.

Herein, in the arrangement of the first, second, third, and fourth planetary gear sets PG1, PG2, PG3, and PG4, the first rotational element N1 is directly connected with the fifth rotational element N5, the ninth rotational element N9, and the tenth rotational element N10, and the sixth rotational element N6 is directly connected with the eighth rotational element N8, by eight shafts TM1 to TM8.

In one embodiment, the eight shafts TM1 to TM8 are arranged as follows.

Each of the eight shafts TM1 to TM8 may be a rotational member that directly or selectively interconnects the input and output shafts with rotational elements of the planetary gear sets PG1, PG2, PG3, and PG4, or may be a fixed member that directly or selectively interconnects the rotational elements with the transmission housing H so as to fix the rotational elements.

The first shaft TM1 connects the first rotational element N1 (first sun gear S1), the fifth rotational element N5 (the second planet carrier PC2), the ninth rotational element N9 (the third ring gear R3), and the tenth rotational element N10 (the fourth sun gear S4).

The second shaft TM2 is connected with the second rotational element N2 (the first planet carrier PC1), and is directly connected with the input shaft IS, thereby always acting as an input element.

The third shaft TM3 is connected with the third rotational element N3 (the first ring gear R1).

The fourth shaft TM4 connects the sixth rotational element N6 (the second ring gear R2) and the eighth rotational element N8 (the third planet carrier PC3), and is selectively connected with the second shaft TM2 and the transmission housing H, thereby selectively acting as an input element or a fixed element. Merely, the fourth shaft TM4 is controlled so as to be not simultaneously connected with the second shaft TM2 and the transmission housing H when acting.

The fifth shaft TM5 is connected with the seventh rotational element N7 (the third sun gear S3), and is selectively connected with the second shaft TM2 and the transmission housing H, thereby selectively acting as an input element or a fixed element. Merely, the fifth shaft TM5 is controlled so as to be not simultaneously connected with the second shaft TM2 and the transmission housing H when acting.

The sixth shaft TM6 is connected with the eleventh rotational element N11 (the fourth planet carrier PC4), and is selectively connected with the third shaft TM3, and is directly connected with the output shaft OS, thereby always acting as an input element.

The seventh shaft TM7 is connected with the fourth rotational element N4 (the second sun gear S2), and is selectively connected with the transmission housing H, thereby selectively acting as a fixed element.

The eighth shaft TM8 is connected with the twelfth rotational element N12 (the fourth ring gear R4), and is selectively connected with the transmission housing H, thereby selectively acting as a fixed element.

The eight shafts TM1 to TM8, the input shaft IS, and the output shaft OS may be selectively interconnected with one another by control elements of three clutches C1, C2, and C3.

The eight shafts TM1 to TM8 may be selectively connected with the transmission housing H, by control elements of four brakes B1, B2, B3, and B4.

In one embodiment, the three clutches C1 to C3 and the four brakes B1 to B4 are arranged as follows.

The first clutch C1 is arranged between the third shaft TM3 and the sixth shaft TM6, and selectively connects the third shaft TM3 and the sixth shaft TM6, thereby controlling power delivery therebetween.

The second clutch C2 is arranged between the second shaft TM2 and the fourth shaft TM4, and selectively connects the second shaft TM2 and the fourth shaft TM4, thereby controlling power delivery therebetween.

The third clutch C3 is arranged between the second shaft TM2 and the fifth shaft TM5, and selectively connects the second shaft TM2 and the fifth shaft TM5, thereby controlling power delivery therebetween.

The first brake B1 is arranged between the eighth shaft TM8 and the transmission housing H, and selectively connects the eighth shaft TM8 to the transmission housing H.

The second brake B2 is arranged between the fourth shaft TM4 and the transmission housing H, and selectively connects the fourth shaft TM4 to the transmission housing H.

The third brake B3 is arranged between the seventh shaft TM7 and the transmission housing H, and selectively connects the seventh shaft TM7 to the transmission housing H.

The fourth brake B4 is arranged between the fifth shaft TM5 and the transmission housing H, and selectively connects the fifth shaft TM5 to the transmission housing H.

The respective control elements of the first, second, and third clutches C1, C2, and C3 and the first, second, third, and fourth brakes B1, B2, B3, and B4 may be realized as multi-plate hydraulic pressure friction devices that are frictionally engaged by hydraulic pressure.

FIG. 2 is an operational chart for respective control elements at respective shift-stages in a planetary gear train according to an embodiment of the present disclosure.

Referring to FIG. 2, a planetary gear train according to an embodiment of the present disclosure realizes ten forward speeds and one reverse speed by operating three control elements among the first, second, and third clutches C1, C2, and C3 and the first, second, third, and fourth brakes B1, B2, B3, and B4 at respective shift-stages. In the forward first speed shift-stage D1, the third clutch C3 and the first and third brakes B1 and B3 are simultaneously operated. As a result, on a state that the second shaft TM2 is connected with the fifth shaft TM5 by the operation of the third clutch C3, the torque of the input shaft IS is input to the second shaft TM2.

In addition, the seventh shaft TM7 and the eighth shaft TM8 act as fixed elements by the operation of the first and third brakes B1 and B3, thereby realizing the forward first speed by cooperative operation of respective shafts and outputting a shifted torque to the output shaft OS connected with the sixth shaft TM6.

In the forward second speed shift-stage D2, the second clutch C2 and the first and third brakes B1 and B3 are simultaneously operated.

As a result, on a state that the second shaft TM2 is connected with the fourth shaft TM4 by the operation of the second clutch C2, the torque of the input shaft IS is input to the second shaft TM2.

In addition, the seventh shaft TM7 and the eighth shaft TM8 act as fixed elements by the operation of the first and third brakes B1 and B3, thereby realizing the forward second speed by cooperative operation of respective shafts and outputting a shifted torque to the output shaft OS connected with the sixth shaft TM6.

In the forward third speed shift-stage D3, the second and third clutches C2 and C3 and the first brake B1 are simultaneously operated.

As a result, on a state that the second shaft TM2 is connected with the fourth shaft by the operation of the second clutch C2 and the second shaft TM2 is connected with the fifth shaft TM5 by the operation of the third clutch C3, the torque of the input shaft IS is input to the second shaft TM2.

In addition, the eighth shaft TM8 acts as a fixed element by the operation of the first brake B1, thereby realizing the forward third speed by cooperative operation of respective shafts and outputting a shifted torque to the output shaft OS connected with the sixth shaft TM6.

In the forward fourth speed shift-stage D4, the second clutch C2 and the first and fourth brakes B1 and B4 are simultaneously operated.

As a result, on a state that the second shaft TM2 is connected with the fourth shaft TM4 by the operation of the second clutch C2, the torque of the input shaft IS is input to the second shaft TM2.

In addition, the fifth shaft TM5 and the eighth shaft TM8 act as fixed elements by the operation of the first and fourth brakes B1 and B4, thereby realizing the forward fourth speed by cooperative operation of respective shafts and outputting a shifted torque to the output shaft OS connected with the sixth shaft TM6.

In the forward fifth speed shift-stage D5, the first and second clutches C1 and C2 and the fourth brake B4 are simultaneously operated.

As a result, on a state that the third shaft TM3 is connected with the sixth shaft TM6 by the operation of the first clutch C1 and the second shaft TM2 is connected with the fourth shaft TM4 by the operation of the second clutch C2, the torque of the input shaft IS is input to the second shaft TM2.

In addition, the fifth shaft TM5 acts as a fixed element by the operation of the fourth brake B4, thereby realizing the forward fifth speed by cooperative operation of respective shafts and outputting a shifted torque to the output shaft OS connected with the sixth shaft TM6.

In the forward sixth speed shift-stage D6, the first, second, and third clutches C1, C2, and C3 are simultaneously operated.

As a result, on a state that the third shaft TM3 is connected with the sixth shaft TM6 by the operation of the first clutch C1 and the second shaft TM2 is connected with the fourth shaft TM4 by the operation of the second clutch C2 and the second shaft TM2 is connected with the fifth shaft TM5 by the operation of the third clutch C3, the torque of the input shaft IS is input to the second shaft TM2.

In this embodiment, the first, second, third, and fourth planetary gear sets PG1, PG2, PG3, and PG4 integrally rotate, and a torque is outputted as inputted, thereby forming the forward sixth speed and outputting the inputted torque to the output shaft OS connected with the sixth shaft TM6.

In the forward seventh speed shift-stage D7, the first and second clutches C1 and C2 and the third brake B3 are simultaneously operated.

As a result, on a state that the third shaft TM3 by is connected with the sixth shaft TM6 the operation of the first clutch C1 and the second shaft TM2 is connected with the fourth shaft TM4 by the operation of the second clutch C2, the torque of the input shaft IS is input to the second shaft TM2.

In addition, the seventh shaft TM7 acts as a fixed element by the operation of the third brake B3, thereby realizing the forward seventh speed by cooperative operation of respective shafts and outputting a shifted torque to the output shaft OS connected with the sixth shaft TM6.

In the forward eighth speed shift-stage D8, the first and third clutches C1 and C3 and the third brake B3 are simultaneously operated.

As a result, on a state that the third shaft TM3 is connected with the sixth shaft TM6 by the operation of the first clutch C1 and the second shaft TM2 is connected with the fifth shaft TM5 by the operation of the third clutch C3, the torque of the input shaft IS is input to the second shaft TM2.

In addition, the seventh shaft TM7 acts as a fixed element by the operation of the third brake B3, thereby realizing the forward eighth speed by cooperative operation of respective shafts and outputting a shifted torque to the output shaft OS connected with the sixth shaft TM6.

In the forward ninth speed shift-stage D9, the first clutch C1 and the second and third brakes B2 and B3 are simultaneously operated. As a result, on a state that the third shaft TM3 is connected with the sixth shaft TM6 by the operation of the first clutch C1, the torque of the input shaft IS is input to the second shaft TM2.

In addition, the fourth shaft TM4 and the seventh shaft TM7 act as fixed elements by the operation of the second and third brakes B2 and B3, thereby realizing the forward ninth speed by cooperative operation of respective shafts and outputting a shifted torque to the output shaft OS connected with the sixth shaft TM6.

In the forward tenth speed shift-stage D10, the first and third clutches C1 and C3 and the second brake B2 are simultaneously operated.

As a result, on a state that the third shaft TM3 is connected with the sixth shaft TM6 by the operation of the first clutch C1 and the second shaft TM2 is connected with the fifth shaft TM5 by the operation of the third clutch C3, the torque of the input shaft IS is input to the second shaft TM2.

In addition, the fourth shaft TM4 acts a fixed element by the operation of the second brake B2, hereby realizing the forward tenth speed by cooperative operation of respective shafts and outputting a shifted torque to the output shaft OS connected with the sixth shaft TM6.

In the reverse speed shift-stage REV, the third clutch C3 and the first and second brake B1 and B2 are simultaneously operated.

As a result, on a state that the second shaft TM2 is connected with the fifth shaft TM5 by the operation of the third clutch C3, the torque of the input shaft IS is input to the second shaft TM2.

In addition, the eighth shaft TM8 and the fourth shaft TM4 act as fixed elements by the operation of the first and second brakes B1 and B2, thereby realizing the reverse speed by cooperative operation of respective shafts and outputting a shifted torque to the output shaft OS connected with the sixth shaft TM6.

As described above, a planetary gear train according to an embodiment of the present disclosure may realize ten forward speeds and one reverse speed formed by operating four planetary gear sets PG1, PG2, PG3, and PG4 by controlling three clutches C1, C2, and C3 and four brakes B1, B2, B3, and C4.

In addition, according to a planetary gear train according to an embodiment, a gear ratio span of more than 10.0 may be provided, thereby maximizing an engine driving efficiency.

Further, the linearity of step ratios of shift stages is secured while multi-staging the shift stage with high efficiency, thereby making it possible to improve drivability such as acceleration before and after a shift, an engine speed rhythmic sense, and the like.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims. It is therefore intended that the foregoing description be regarded as illustrative rather than limiting, and that it be understood that all equivalents and/or combinations of embodiments are intended to be included in this description.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

What is claimed is:

1. A planetary gear train of an automatic transmission for a vehicle, the planetary gear train comprising:
    an input shaft configured to receive an engine torque;
    an output shaft configured to output a shifted torque;
    a first planetary gear set having first, second, and third rotational elements;
    a second planetary gear set having fourth, fifth, and sixth rotational elements;
    a third planetary gear set having seventh, eighth, and ninth rotational elements;
    a fourth planetary gear set having tenth, eleventh, and twelfth rotational elements;
    a first shaft interconnecting the first rotational element, the fifth rotational element, the ninth rotational element, and the tenth rotational element;
    a second shaft connected with the second rotational element and connected with the input shaft;
    a third shaft connected with the third rotational element;
    a fourth shaft interconnecting the sixth rotational element and the eighth rotational element, and selectively connected with the second shaft;
    a fifth shaft connected with the seventh rotational element and selectively connected with the second shaft; and
    a sixth shaft connected with the eleventh rotational element and connected with the output shaft.

2. The planetary gear train of claim 1, further comprising:
    a seventh shaft connected with the fourth rotational element and selectively connected with a transmission housing; and
    an eighth shaft connected with the twelfth rotational element and selectively connected with the transmission housing,
    wherein the fourth shaft is selectively connected with the transmission housing, and the fifth shaft is selectively connected with the transmission housing, and the sixth shaft is selectively connected with the third shaft.

3. The planetary gear train of claim 2, wherein:
    the first, second, and third rotational elements of the first planetary gear set are respectively a first sun gear, a first planet carrier, and a first ring gear of the first planetary gear set;
    the fourth, fifth, and sixth rotational elements of the second planetary gear set are respectively a second sun gear, a second planet carrier, and a second ring gear of the second planetary gear set;
    the seventh, eighth, and ninth rotational elements of the third planetary gear set are respectively a third sun gear, a third planet carrier, and a third ring gear of the third planetary gear set; and
    the tenth, eleventh, and twelfth rotational elements of the fourth planetary gear set are respectively a fourth sun gear, a fourth planet carrier, and a fourth ring gear of the fourth planetary gear set.

4. The planetary gear train of claim 3, wherein the first, second, third, and fourth planetary gear sets are arranged in an order of the first planetary gear set, the third planetary gear set, the second planetary gear set, and the fourth planetary gear set, from an engine side.

5. The planetary gear train of claim 2, wherein the first, second, third, and fourth planetary gear sets are arranged in an order of the first planetary gear set, the third planetary gear set, the second planetary gear set, and the fourth planetary gear set, from an engine side.

6. The planetary gear train of claim 2, further comprising:
    a first clutch selectively connecting the third shaft and the sixth shaft;
    a second clutch selectively connecting the second shaft and the fourth shaft;
    a third clutch selectively connecting the second shaft and the fifth shaft;
    a first brake selectively connecting the eighth shaft to the transmission housing;
    a second brake selectively connecting the fourth shaft to the transmission housing;
    a third brake selectively connecting the seventh shaft to the transmission housing; and
    a fourth brake selectively connecting the fifth shaft to the transmission housing.

7. The planetary gear train of claim 6, wherein the first, second, third, and fourth planetary gear sets are arranged in an order of the first planetary gear set, the third planetary gear set, the second planetary gear set, and the fourth planetary gear set, from an engine side.

8. The planetary gear train of claim 1, wherein:
    the first, second, and third rotational elements of the first planetary gear set are respectively a first sun gear, a first planet carrier, and a first ring gear of the first planetary gear set;
    the fourth, fifth, and sixth rotational elements of the second planetary gear set are respectively a second sun gear, a second planet carrier, and a second ring gear of the second planetary gear set;
    the seventh, eighth, and ninth rotational elements of the third planetary gear set are respectively a third sun gear, a third planet carrier, and a third ring gear of the third planetary gear set; and
    the tenth, eleventh, and twelfth rotational elements of the fourth planetary gear set are respectively a fourth sun gear, a fourth planet carrier, and a fourth ring gear of the fourth planetary gear set.

9. The planetary gear train of claim 8, wherein the first, second, third, and fourth planetary gear sets are arranged in an order of the first planetary gear set, the third planetary gear set, the second planetary gear set, and the fourth planetary gear set, from an engine side.

10. The planetary gear train of claim 1, wherein the first, second, third, and fourth planetary gear sets are arranged in an order of the first planetary gear set, the third planetary gear set, the second planetary gear set, and the fourth planetary gear set, from an engine side.

11. A planetary gear train of an automatic transmission for a vehicle, the planetary gear train comprising:
- an input shaft configured to receive an engine torque;
- an output shaft configured to output a shifted torque;
- a first planetary gear set having first, second, and third rotational elements;
- a second planetary gear set having fourth, fifth, and sixth rotational elements;
- a third planetary gear set having seventh, eighth, and ninth rotational elements; and
- a fourth planetary gear set having tenth, eleventh, and twelfth rotational elements, wherein:
- the input shaft is connected with the second rotational element;
- the output shaft is connected with the eleventh rotational element;
- the first rotational element is connected with the fifth, ninth, and tenth rotational elements;
- the sixth rotational element is connected with the eighth rotational element;
- the seventh rotational element is selectively connected with the second rotational element;
- the eighth rotational element is selectively connected with the second rotational element; and
- the eleventh rotational element is selectively connected with the third rotational element.

12. The planetary gear train of claim 11, wherein the fourth, sixth, seventh, and twelfth rotational elements are respectively and selectively connected to a transmission housing.

13. The planetary gear train of claim 11, wherein:
- the first, second, and third rotational elements of the first planetary gear set are respectively a first sun gear, a first planet carrier, and a first ring gear of the first planetary gear set;
- the fourth, fifth, and sixth rotational elements of the second planetary gear set are respectively a second sun gear, a second planet carrier, and a second ring gear of the second planetary gear set;
- the seventh, eighth, and ninth rotational elements of the third planetary gear set are respectively a third sun gear, a third planet carrier, and a third ring gear of the third planetary gear set; and
- the tenth, eleventh, and twelfth rotational elements of the fourth planetary gear set are respectively a fourth sun gear, a fourth planet carrier, and a fourth ring gear of the fourth planetary gear set.

14. The planetary gear train of claim 13, wherein the fourth, sixth, seventh, and twelfth rotational elements are respectively and selectively connected to a transmission housing.

15. The planetary gear train of claim 13, wherein the first, second, third, and fourth planetary gear sets are arranged in an order of the first planetary gear set, the third planetary gear set, the second planetary gear set, and the fourth planetary gear set, from an engine side.

16. The planetary gear train of claim 11, wherein the first, second, third, and fourth planetary gear sets are arranged in an order of the first planetary gear set, the third planetary gear set, the second planetary gear set, and the fourth planetary gear set, from an engine side.

17. The planetary gear train of claim 16, wherein the fourth, sixth, seventh, and twelfth rotational elements are respectively and selectively connected to a transmission housing.

18. The planetary gear train of claim 12, further comprising:
- a first clutch selectively interconnecting the third rotational element and the eleventh rotational element;
- a second clutch selectively interconnecting the second rotational element and the eighth rotational element;
- a third clutch selectively interconnecting the second rotational element and the seventh rotational element;
- a first brake selectively connecting the twelfth rotational element to the transmission housing;
- a second brake selectively connecting the sixth rotational element to the transmission housing;
- a third brake selectively connecting the fourth rotational element to the transmission housing; and
- a fourth brake selectively connecting the seventh rotational element to the transmission housing.

19. The planetary gear train of claim 18, wherein:
the first, second, and third rotational elements of the first planetary gear set are respectively a first sun gear, a first planet carrier, and a first ring gear of the first planetary gear set;
the fourth, fifth, and sixth rotational elements of the second planetary gear set are respectively a second sun gear, a second planet carrier, and a second ring gear of the second planetary gear set;
the seventh, eighth, and ninth rotational elements of the third planetary gear set are respectively a third sun gear, a third planet carrier, and a third ring gear of the third planetary gear set; and
the tenth, eleventh, and twelfth rotational elements of the fourth planetary gear set are respectively a fourth sun gear, a fourth planet carrier, and a fourth ring gear of the fourth planetary gear set.

20. The planetary gear train of claim 18, wherein the first, second, third, and fourth planetary gear sets are arranged in an order of the first planetary gear set, the third planetary gear set, the second planetary gear set, and the fourth planetary gear set, from an engine side.

* * * * *